Oct. 30, 1956
G. M. BOOTH
2,768,751
APPARATUS FOR FILTRATION WITH FINELY
DIVIDED FILTERING MATERIAL
Filed Feb. 10, 1951
2 Sheets-Sheet 1
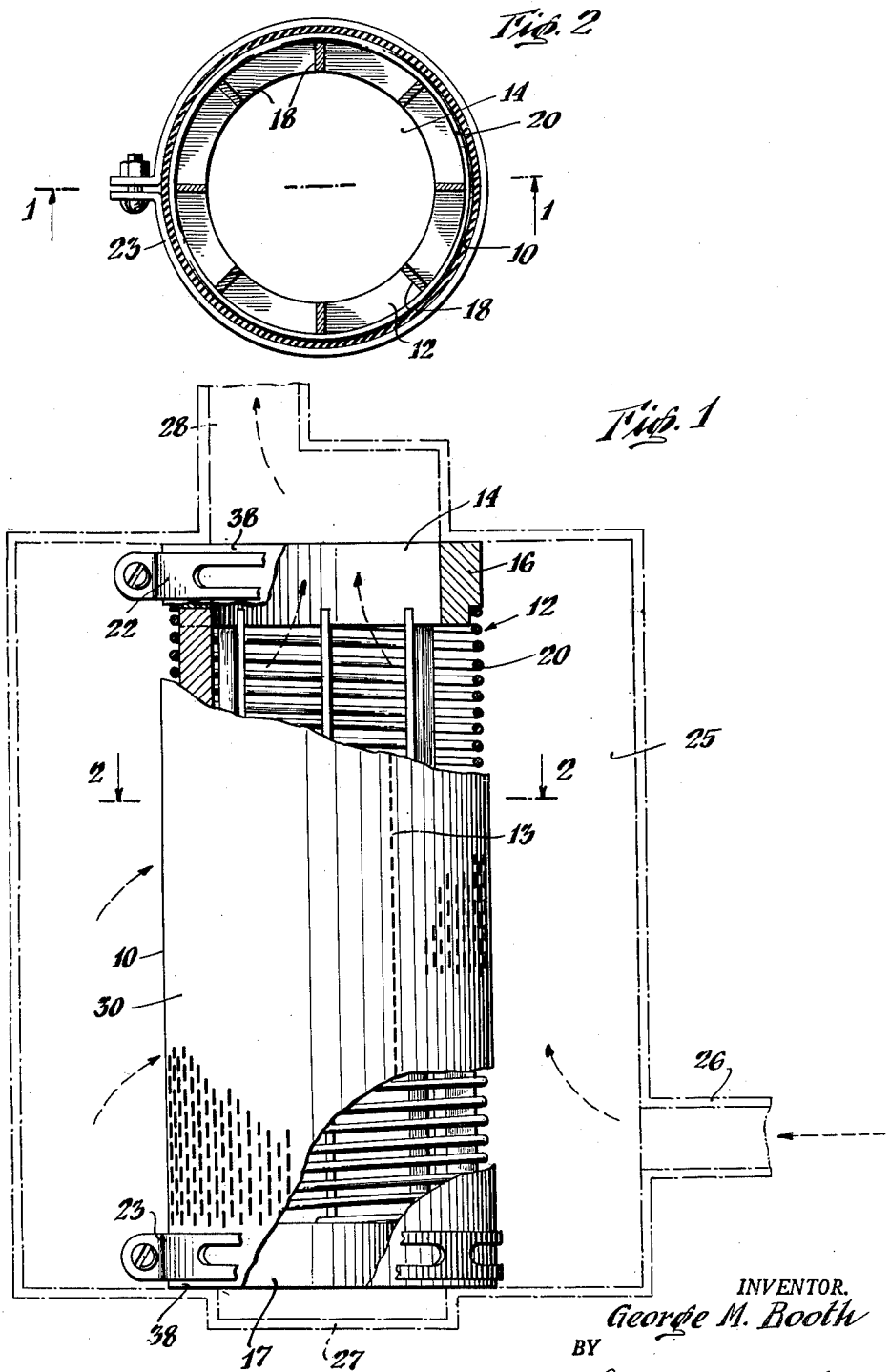
INVENTOR.
George M. Booth
BY
Robert S. Dunham
ATTORNEY Oct. 30, 1956     G. M. BOOTH     2,768,751
APPARATUS FOR FILTRATION WITH FINELY
DIVIDED FILTERING MATERIAL
Filed Feb. 10, 1951     2 Sheets-Sheet 2
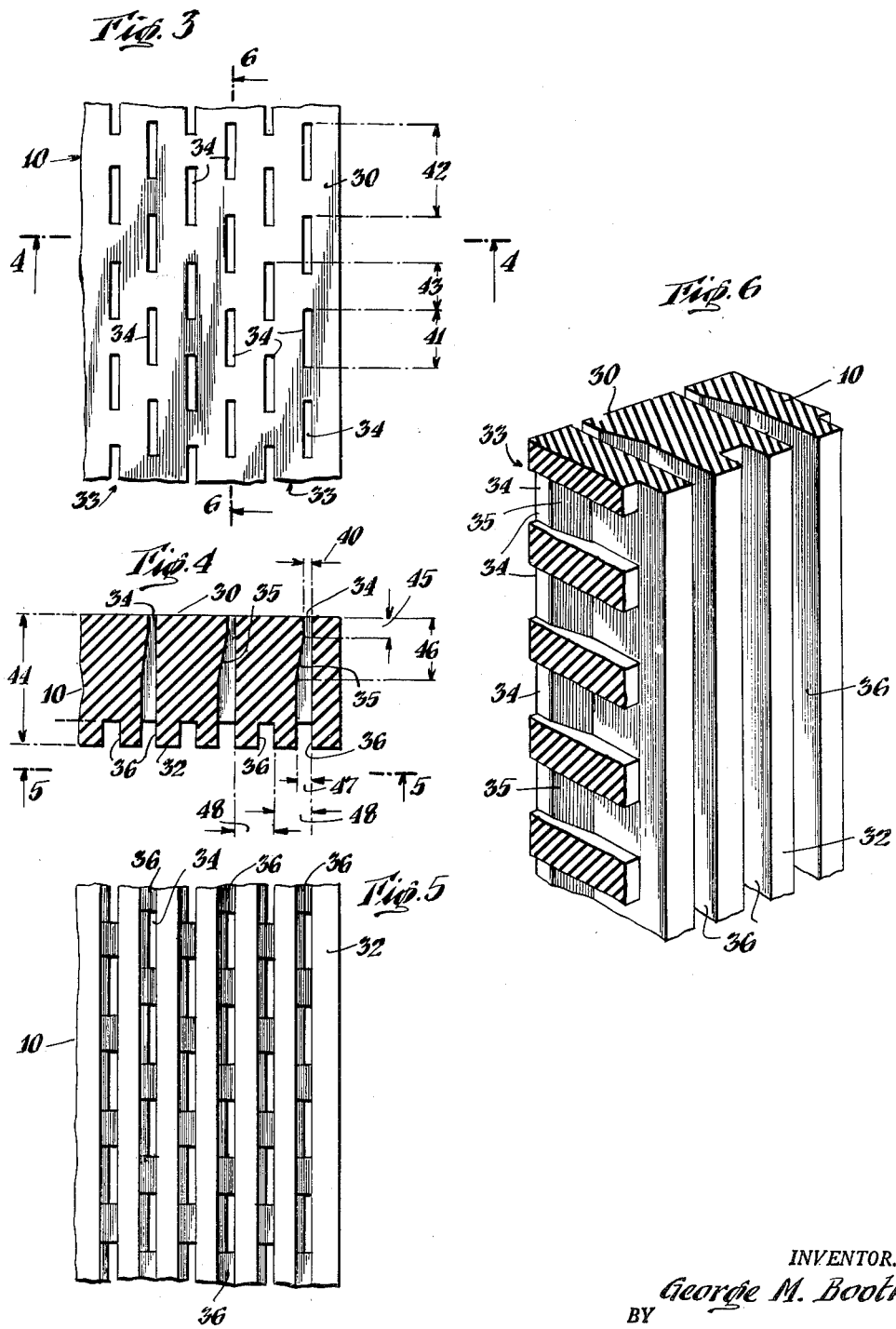
INVENTOR.
George M. Booth
BY
Robert S. Dunham
ATTORNEY.

United States Patent Office 2,768,751
Patented Oct. 30, 1956

2,768,751

APPARATUS FOR FILTRATION WITH FINELY DIVIDED FILTERING MATERIAL

George M. Booth, Westfield, N. J., assignor to Wallace & Tiernan Incorporated, a corporation of Delaware Application February 10, 1951, Serial No. 210,420

5 Claims. (Cl. 210—169)

This invention relates to filters, more particularly apparatus for filtration with the aid of finely divided filtering material, and in one important, specific sense, is directed to the provision of new and improved septum structure upon which the filtering material is received as a coating or layer.

An effective type of filter, e. g. for removing suspended matter from various aqueous and other liquids, involves a porous or finely apertured element, i. e. a septum, interposed in the path of the liquid, so that the fine particles of filter aid may build up as a permeable coating over the face of the septum, such coating constituting the effective filtration instrumentality for retaining and thus removing the suspended particles of impurities or the like, from the liquid which is forced through the septum. The filtering material (sometimes called filter aid) may be of any of various substances suitable for such purpose, a chief and most widely used example being diatomaceous earth, and the present improvements being of exceptional advantage for material of such character. While the coating can be established and maintained in a number of ways, one suitable procedure is first to traverse the septum with liquid carrying a large proportion of the filter aid in suspension, so that a relatively thick pre-coat is built up over the face of the septum. Thereafter if desired and particularly if filtration of liquid is to be carried on continuously over a prolonged interval, successive, lesser quantities of the filtering material may be introduced in suspension in the liquid and thus brought to the septum. By thus adding further small quantities of diatomaceous earth, for example, to the water or other liquid, the material continues to build up on the septum or filter screen and thereby maintains a relatively porous body so that accumulated solids do not promptly choke the filter.

A number of different structures have been used or proposed for septums, such as porous stones, appropriately supported wire cloth, skeleton cylinders helically wound with closely spaced, fine wire, or rigid cylinders or other wall structures of rigid porous metallic material. Although the septum may be in the form of a plane surface or have other configuration spanning the chamber or conduit through which the liquid flows, a convenient arrangement is to provide one or more cylindrical supports, each embodying or carrying a corresponding, cylindrical septum or screen, with appropriately chambered structure arranged in the liquid conduit whereby the path of flow extends from a remote locality to the exterior of the cylindrical device, then through the wall of the latter and from its internal bore to the delivery or discharge conduit. One example of such a filter is shown in my Patent No. 2,423,172, issued July 1, 1947, wherein an advantageous backwashing apparatus is described and claimed, relative to the removal of the filtering material from the septum or filter support at the end of a filtration run. Indeed reference may be had to the cited patent for further explanation of the structure and functioning of filtering apparatus of this character.

Although the filtering material, such as diatomaceous earth, preferably has a particle size much smaller than the fine openings of the porous or permeable septum, the intended function of the material is to bridge or arch, by agglomeration, over the openings of the septum, so that a rather dense but permeable body or layer of the filter aid is built up. While this process undoubtedly occurs, experience has revealed that after some time of use the septum openings gradually fill up and become clogged, to the extent that backwashing is no longer possible, even with the unusually effective air-bump system described in the above cited patent. That is to say, after a given run of the filter, a violent and rapid reverse flow of liquid is effected to dislodge and carry away the coat of diatomaceous earth, but at least after a number of successive runs and backwashings, the septum itself becomes so firmly clogged as to prevent dislodgement of the material clogging it, which may be particles of the diatomaceous earth, particles of impurities separated from the water or other matter such as slime or like organic growth that has accumulated. Such plugging of the septum appears gradually with normal use of the filter and may occur very promptly or rapidly under abnormal conditions or with misuse such as in permitting the filter to stand idle when it is filled with contaminated water so that slime actually grows in the openings. Plugging of the last described sort is practically impossible to remove, especially with septums that are porous stones or have like characteristics. While it has been proposed to clean various septums by the aid of strong chemicals such as acid solutions at boiling temperature, such procedures are not very practical (e. g. in military or other field use of a filter); while a wire-wound septum can be somewhat cleaned with brushes, the operation is again time-consuming and laborious.

Accordingly, important objects of the present invention are to provide novel filtering apparatus, obviating or reducing the difficulties explained above, and especially affording a structure that can be easily and rapidly cleaned to a point where it is wholly or substantially free of clogging, such cleaning being effected by reverse flow, preferably of the sudden and powerful character disclosed in the above cited patent. A further object is to provide an improved septum structure which functions efficiently to support the layer of filtering material yet which may be rapidly and thoroughly cleaned by back-washing, to the extent that clogging is greatly delayed, or indeed in most cases wholly obviated. Another object is to provide improvements in filtering apparatus and component structure thereof, whereby the apparatus may be operated over very long periods of time, and through many successive runs, without special or unusual attention to the removal of plugging or the like in the filter septum.

To these and other ends, the present invention contemplates a filtration apparatus of the character described, including a novel septum element or structure which consists of a flexible, sheet-like body having a great multiplicity of fine openings distributed throughout. In a more specific sense, the invention embraces a septum element comprising a semi-soft, resilient sheet structure, e. g. of molded plastic, having a multiplicity of elongated grooves on one side and opening from the other side into the grooves, a multiplicity of fine, spaced apertures, the arrangement being preferably contemplated for use with the liquid flowing through the sheet from the spaced aperture side of the grooved side. A particularly advantageous example of the device involves resilient plastic molded to a sheet form with the described grooved and apertured structure, the grooves running continuously, longitudinally of the sheet, closely parallel to each other and having a suitable depth, while the separated openings consist of successive slots registering with the grooves and extending lengthwise thereof. In the filter, the sheet is mounted on a suitable support, advantageously having supporting members that run crosswise of the grooves, the grooved side being thus preferably in facing relation to, and abutment with the supporting members. The sheet element is conveniently secured by its edge portions only, so that central parts of it are free to flex away from the supporting grid or like structure upon the application of fluid pressure through such structure against the grooved side of the septum, it being understood that if in some cases, i. e. as in filters having very large septum area, there is need to mount a complete sheet at intermediate localities of its face, these should preferably be widely spaced so that the several portions of the sheet structure bounded by localities of attachment may each be considered as an individual septum having the stated characteristics and fastened only at its edge portions with the central region free to flex outwardly.

While for some purposes a septum of the nature described herein may be shaped or mounted to occupy any of a variety of surface configurations, including a plane surface of vertical, horizontal or other disposition, a particularly effective structure, embodying specific features of invention, is constituted by a cylindrical or tubular arrangement having the grooves extending axially along the inner surface of the cylinder, with the spaced apertures in closely adjacent axial rows on the outer surface. The tubular septum may then conveniently be mounted on a cylindrical support, preferably having its axis in a vertical position and composed, for example, of a multiplicity of more or less horizontal supporting members arranged in a cylindrical surface, such as a wire helix wound on an appropriate frame of circumferentially spaced, axially extending members. The sheet-like, cylindrical septum itself may be molded in such form, or very conveniently molded as a flat sheet which is then rolled or curled into a cylinder with its longitudinal edges appropriately joined, i. e. to form an axial seam. In filter structures so arranged, the sheet-like cylindrical element is thus carried on the outer surface of the corresponding cylindrical grid, being fastened by clamps or the like at its ends. Such cylindrical filter arrangements may thus be embodied in apparatus such as disclosed in the above cited Patent No. 2,423,172, with appropriate chambers and conduits so that in normal use liquid flows into the space around the exterior of the septum, then through the septum and grid into the interior of the filter assembly and thence to a locality of use for the liquid. The filtering material is coated on the exterior of the septum.

At the end of a filtering operation, the filter assembly, including the septum, may be cleaned by a reverse flow of fluid, e. g. preferably by a sudden burst or flow of liquid into the interior of the cylinder and outwardly through the flexible septum. An extremely important advantage of the present invention is the effectiveness with which such cleaning operation performs its intended function. That is to say, the reverse fluid pressure causes the sheet-like, flexible septum to expand, the sheet being forced away from its supporting structure (except at the edges) and the openings being enlarged so as to release particles that may have become seated in the openings, and so as to afford a very thorough flushing of the septum. Not only is the coating of diatomaceous earth or the like thus effectively removed and swept or washed away, but the operation very easily clears out any and all particles, both of the filter aid and of other character, which may have become lodged in the pores or openings and which in prior structures are difficult to dislodge and thus sooner or later tend to clog the septum. After each such cleaning or backwashing operation, the filter is immediately ready for another run, there being no necessity to employ any special scrubbing or acid or other detergent substance or even to have access to the septum itself.

The accompanying drawings illustrate one presently preferred embodiment of the invention, e. g. as related to filtering apparatus of the vertically-arranged, cylindrical septum type.

In the drawings:

Fig. 1 is an elevational view of filtering apparatus, specifically of a cylindrically arranged filter septum with its supporting structure, an upper portion of the assembly being shown in vertical section as on line 1—1 of Fig. 2, and the septum element being also broken away at a lower portion;

Fig. 2 is a horizontal section on line 2—2 of Fig. 1;

Fig. 3 is a very greatly enlarged elevation (of the front or outer side) of a fragment of the sheet-like septum of Fig. 1;

Fig. 4 is a horizontal section on line 4—4 of Fig. 3;

Fig. 5 is an elevation of the opposite side of the septum sheet shown in Fig. 3, Fig. 5 being thus taken on line 5—5 of Fig. 4; and Fig. 6 is a similarly enlarged, perspective view of a fragment of the septum sheet, the forward left-hand face of the fragment shown in Fig. 6 being as if taken in vertical section on line 6—6 of Fig. 3.

In Figs. 1 and 2 the novel septum structure 10 is shown as of sheet-like form wrapped around a supporting frame generally designated 12, it being understood that the septum 10, of molded flexible plastic, may be initially manufactured as a flat or plane sheet which is then brought to a suitable cylindrical shape with its axially adjacent edges closed at a seam 13, e. g. a butt or other seam, secured by heat sealing, suitable adhesive or other means appropriate to the composition of the plastic body. The structure being illustrated as a part of a filtering apparatus, the frame 12 is of generally cylindrical shape, preferably to be mounted in a vertical or substantially vertical position (as shown), with a hollow core 14. While frames of various sorts may be employed for holding and supporting the septum, the chief requirement being a grid-like or similarly apertured surface to underlie the septum sheet and means for securing the sheet at its edges, the supporting frame 12 is believed to represent an advantageous and effective structure.

Specifically, the support 12 comprises upper and lower, annular head members 16, 17, between which a plurality of supporting bars or ribs 18 extend. Although the entire supporting frame 12, or assemblies of it may constitute moldings of rigid plastic or the like, the illustrated parts 16, 17 and 18 are shown as of metal, the long bars or ribs 18 being secured in suitable notches of the annular members 16, 17, and being arranged in a cylindrical array so as to provide appropriate support, by their outer edges, for a winding or helix 20 of stiff wire. The wire helix 20, having a large multiplicity of turns with a spacing that is close relatively to the spacing of the ribs 18 but large relative to the dimensions of the openings in the septum 10 (as described below), constitutes a grid-like part of the frame for effective support of the septum 10. The septum 10, disposed around the cylindrical surface thus constituted by the wire helix 20 and the outer faces of the upper and lower members 16, 17, is secured in place by clamps 22, 23 around the septum at the localities of the members 16, 17, respectively.

The septum being apertured, fluid flow is thus permissible between the exterior of the septum and the interior 14 of the frame 12. Simply for the sake of illustration, Fig. 1 shows in broken lines a chamber 25 surrounding the above-described unit and having an inlet port or conduit 26, the chamber 25 being closed at the ends to the members 16, 17 so that there is no communication with the bore 14 except through the septum 10. Similarly in broken lines, Fig. 1 shows discharge means for the interior of the filter unit, e. g. means at 27 for closing one end of the bore 14 with means 28 at the other end through which fluid may discharge. It will be understood, of course, that structures 25 to 28 inclusive are shown in diagrammatic fashion, more detailed apparatus being such as now employed for cylindrical filter elements, e. g. as shown in the cited patent No. 2,423,172. In the normal course of filtration, water or other liquid to be filtered enters through the conduit 26, then from all parts of the chamber 25 (which surrounds the illustrated unit) flows in the direction of the dotted arrows through and to the septum, passing freely through the helical grid 20 and thence along the paths of the further dotted arrows through the bore 14 and the discharge conduit 28.

The novel structure of the sheet which constitutes the septum 10 is shown more particularly in the fragmentary, tremendously enlarged views of Figs. 3 to 6 inclusive. Here the outer surface of the sheet, against and into which the liquid normally flows, is indicated at 30 and the inner surface at 32. The outer surface 30 is perforated by a multiplicity of rows 33 of endwise spaced, fine, rectangular slots 34, the slots extending inwardly through the septum body 10, each widening considerably toward the central part of the body, for example by virtue of a flaring wall 35 as indicated. The use of apertures in the shape of fine, narrow slots 34 is believed to be unusually advantageous and thus to represent an important specific feature, in the described and at least somewhat elastic septum structure. Near the inner face 32 of the septum, each row 33 of the slots opens into a corresponding long, rectangular groove 36, so that the inner face has a configuration formed by a multiplicity of relatively closely spaced grooves 36, parallel to each other and conveniently extending across the entire operative inner face area 32, e. g. in a vertical direction when the septum is embodied in a tubular shape around a vertical support as shown in Figs. 1 and 2.

As indicated above, the described sheet structure may be made in various ways, preferably by molding from a suitable plastic composition which is appropriately set or otherwise solidified to have a flexible, moderately elastic and somewhat soft body, examples of suitable compositions being natural or synthetic rubber and various other elastic substances such as neoprene, and plasticized polyvinyl chloride. While in some cases the septum sheet can simply be made in large sheets which are then cut into smaller pieces, as for making the tubular elements of Figs. 1 and 2, a convenient practice is to mold the sheets to the exact circumferential dimensions desired for a single tube, end portions of the sheet being left unperforated and ungrooved, e. g. as indicated at 38 in Fig. 1, for more appropriate cooperation with the clamping devices such as shown at 22, 23. As also stated, the sheet can be joined by a longitudinal seam at 13 to form the tubular shape, or alternatively can be molded in such shape as a seamless body.

It will now be understood that in use, the coating of filter material, such as diatomaceous earth, is built up by the flowing liquid on the outer surface of the septum, the particles of the material cohering sufficiently to bridge the slots 34 to the extent necessary. As water or other liquid to be filtered traverses the assembly, the undesired contaminating particles or other solids in the water are retained by the device, chiefly or entirely in the coating of filter material, the liquid itself traversing the slots 34 and being withdrawn from the rear face 32. Where a grid or other supporting member 20 crosses the grooves 36, the liquid simply travels a very brief distance along the groove to an opening between the grid members, e. g. for passage into the core region 14 of the filter assembly, and thence to the locality of distribution and use.

When it becomes necessary to backwash the filter, i. e. when the coating of diatomaceous earth or the like has been built up as thickly as possible and has become essentially filled with the separated impurities, a reversal of flow is effected, for instance with clear water or other liquid. Traveling through the septum from the inner to the outer side, the backwashing flow, under pressure, expands the septum away from the supporting members 20, thus widening the slots 34 and not only carrying away the layer of filtering material on the outer surface 30 but effectively dislodging and removing any and all particles or other solids that may have become trapped in the slots or other apertured regions of the septum. While a sudden and vigorous backwash flow of the sort provided by the air-bump system of my cited patent is particularly effective, investigations have demonstrated that in most cases good backwashing can be achieved with only a very moderate, outward pressure. That is to say, a very small pressure drop between the inner and outer faces of the edgewise retained septum is sufficient to enlarge the cylinder and expand the slots 34 so as to wash out anything that may have been clogging or tending to clog the slots.

It will be noted that the slots 34 are very preferably arranged in a staggered manner (Figs. 3 and 5), i. e. so that the ends of each slot overlap (in a horizontal or lateral sense) the ends of the nearest slots in each adjacent row. While it is at present understood that satisfactory operation could be achieved with the slots in a laterally aligned, i. e. non-staggered arrangement (particularly with appropriately soft or highly elastic material for the body 10), the staggered arrangement is believed to promote or facilitate the widening of the slots in backwashing. The portions of body material between adjacent, staggered slots, are then required to stretch along vertically narrow paths (rather than sidewise along the entire length of each slot) so as to achieve the desired stretching and widening of the slots with less force, the stretching action being then somewhat similar to that obtained in the expansion of slotted or slitted metal sheet (e. g. with staggered rows of slits) in the manufacture of expanded metal lath or the like.

While the dimensions of the septum structure may vary quite considerably, depending on the size of the filter, the nature of the substance employed for the body 10, and other circumstances of use, one set of dimensions is given below simply as an example of a structure that has been found satisfactory. As stated, these dimensions are not generally now believed to be critical, but the width 40 of the slots 34 appears to require special consideration, e. g. in the light of the filter aid to be employed. Thus in the case of diatomaceous earth having the extremely fine particle size which is customarily characteristic of such material as commercially available for filtration operations of this type, it appears that the slot width 40 should be less than 0.005 inch, and very preferably not more than about 0.004 inch, slots wider than the last-named value being found difficult to pre-coat, and the difficulty being found to increase greatly as the slotted width reaches, or exceeds, say, 0.005 inch. Although precoating may sometimes be facilitated with still narrower slots, the filter runs are then likely to be reduced or otherwise impaired, e. g. not only by creating a greater pressure drop between the faces 30 and 32, but by an increased tendency to entrap solids (either impurities or particles of filter aid) in the slots. A convenient minimum width is probably about 0.001 inch, with superior, overall results being achieved in the range of 0.002 to 0.004 inch, a critically optimum value being 0.004 inch.

The examples of other dimensions (as explained above) include a slot length 41 of $\frac{1}{16}$ inch, a slot pitch 42, in each row 33, of $\frac{3}{32}$ inch and a stagger 43, between corresponding ends of slots in adjacent rows, of $\frac{3}{64}$ inch. With the slot width 40 at a value of 0.004 inch, and a total thickness 44 of $\frac{5}{64}$ inch for the septum sheet 10, the narrow part of each slot may have a depth 45 of 0.01 inch, thence widening through a flaring part 35 to a distance (at 46) about 0.04 inch below the surface 30. The grooves 36, as indicated, may and should preferably be considerably wider than the slots (e. g. by 50% or more), the indicated grooves 36 having here a width 47 of 0.01 inch and having a sidewise pitch 48 of 0.025 inch.

As explained above, the normal use of filters such as shown in Fig. 1 and arranged with the improved septum structure 10 of the present invention, involves first pre-coating the septum, as by first passing through the device a flow of liquid carrying a heavy suspension of diatomaceous earth. In this manner a so-called pre-coat is built up entirely throughout the entire face 30 of the septum sheet, with the particles of material agglomerated sufficiently to bridge the slots 34 while retaining a desired inter-particle porosity. Thereafter filtration of the water or other liquid can proceed in the normal manner, preferably with the aid of additional small quantities of the filtering material, continuously carried to the septum 10 by suspension in the liquid and serving to build up the coat in a gradual manner throughout the run. When filtration of a desired quantity of liquid has been completed or when a marked reduction of flow or increase of pressure drop indicates that the coat is becoming clogged, backwashing is effected. As now already explained, the present septum structure is extremely advantageous, in promoting rapid and effective backwashing at relatively low pressure. The entire filter sheet bulges outwardly from the supporting helical grid 20 or the like during backwashing, and the reverse flow of fluid (usually water or other clear liquid, although even gaseous fluid may conceivably be employed) not only carries away the spent coat of filter aid, but effectively dislodges and removes everything that may have become caught in the septum, especially the fine slots 34. In this fashion the septum is restored essentially to new condition after each filter run and its progressive clogging over a long series of runs is largely or indeed in most cases entirely obviated. Even if a delay in backwashing is permitting slime or other growth to accumulate in the septum openings, such accumulations are readily removed by the backwashing flow when the perforations of the septum are expanded during such operation. The entire structure is essentially very rugged and once installed in a filter may be employed for many, many runs without requiring access for scrubbing or the like, and indeed without any attention whatever except for performance of the separately controlled, backwashing step.

It is to be understood that the invention is not limited to the specific structures herein shown and described but may be embodied in other forms without departure from its spirit.

I claim:

1. In a filter adapted to carry liquid through a layer of finely divided filter material on a septum, in combination, a frame adapted to support a septum on one side thereof, a sheet-like septum covering said frame at said side and secured thereto only at edge regions of the septum, means for conducting liquid to be filtered from a remote locality toward the septum-carrying side of the frame, and means for conducting filtered liquid away from the other side of the frame toward another remote locality, said two liquid conducting means cooperating for flow of said liquid through the septum, said frame including a rigid surface structure having a multiplicity of openings distributed throughout and a multiplicity of rigid impervious members cooperatively defining the openings and adapted to abut the adjacent face of the septum distributively throughout, in supporting relation to said septum, said sheet-like septum comprising a structure of elastic impervious material, adapted to be elastically stretched and having a multiplicity of fine apertures for passage of liquid, said apertures adapted to be bridged by the aforesaid filter material contained in the liquid being filtered, to retain a layer of same thereon by deposit from the liquid, said septum having a multiplicity of parallel grooves in its aforesaid face adjacent the frame, said grooves communicating with the apertures and arranged in crossing relation to the rigid members, said grooves being longer than the width of said rigid members, the intermediate portions of said elastic septum structure between said edge regions being adapted to be displaced from the frame into stretched condition for enlargement of said apertures and release of filtering material when flow of fluid is effected through the frame-supported septum in a direction opposite to that of the aforesaid liquid conducting means.

2. A filter as described in claim 1, in which the frame has a substantially cylindrical configuration and the rigid surface structure thereof is disposed substantially around and along it to provide a cylindrical surface, said septum having a tubular shape surrounding and abutting said cylindrical surface and having its aforesaid grooves disposed axially relative to the cylinder, said filter including clamping means annularly engaging the tubular septum only at its ends for securing the septum to the frame.

3. A filter as defined in claim 1, in which said grooves extend across the entire face of the septum, between said edge regions.

4. A filter comprising a generally cylindrical frame including a plurality of peripherally spaced longitudinally extending ribs, a plurality of rings encircling said ribs and spaced longitudinally from one another, said ribs and rings cooperating to define a plurality of openings providing liquid communication between the inside and outside of said frame, a septum sleeve of elastic, impervious material adapted to be elastically stretched, said sleeve encircling said frame, said sleeve having a multiplicity of longitudinal grooves in its inner surface, said septum being supported on said frame by engagement of the portions of said inner surface between said grooves and the peripheries of said rings, said groves being substantially longer than the width of said rings, and a multiplicity of slots arranged at spaced intervals along the bottoms of the grooves and providing liquid communication between the grooves and the outer face of the septum, said grooves being continuously in liquid communication with at least one of said openings, so that all said slots are continuously in liquid communication with the outside and inside of said frame.

5. In a filter adapted to carry liquid through a layer of finely divided filter material on a septum, in combination, a hollow tubular frame adapted to support a concentric tubular septum on one side thereof, said frame including a rigid surface structure having solid portions defining a multiplicity of openings between the inside and outside of the frame, said openings and solid portions being distributed throughout said frame, said solid portions being adapted to abut the adjacent face of the septum, an integral tubular septum member of elastic impervious material shaped and disposed for close conforming fit against said rigid surface structure, said septum member being removably secured at its ends only to said frame against lateral displacement therefrom, said septum member being free intermediate its ends and throughout its circumference to bulge away from the frame, said septum member being adapted to be elastically stretched and having a multiplicity of fine apertures for passage of liquid, means for conducting liquid to be filtered from a remote locality toward the septum-carrying side of the frame, and means for conducting filtered liquid away from the other side of the frame toward another remote locality, said two liquid conducting means cooperating for flow of said liquid through the septum, said apertures adapted to be bridged by the aforesaid filter material contained in the liquid being filtered, to retain a layer of same thereon by deposit from the liquid, said septum having a multiplicity of parallel grooves in its aforesaid face adjacent the frame, said grooves communicating with the apertures and arranged in crossing relation to the solid portions, said grooves being longer than the solid portions at said crossings so that each groove and thereby each aperture is in fluid communication with at least one of said openings, the intermediate portions of said septum member being adapted to be displaced away from the frame into stretched condition for enlargement of said apertures and release of filtering material when flow of fluid is effected through the frame-supported septum in a direction opposite to that of the aforesaid liquid conducting means.

References Cited in the file of this patent

UNITED STATES PATENTS

| | | |
|---|---|---|
| 87,385 | Winchester | Mar. 2, 1869 |
| 1,341,187 | McPheeters | May 25, 1920 |
| 1,629,018 | Coberly | May 17, 1927 |
| 1,631,585 | D'Olier et al. | June 7, 1927 |
| 1,663,298 | Geer et al. | Mar. 20, 1928 |
| 1,677,118 | Ford | July 20, 1928 |
| 2,115,122 | Prudden | Apr. 26, 1938 |
| 2,267,752 | Ruska et al. | Dec. 30, 1941 |
| 2,272,175 | Jordan | Feb. 10, 1942 |
| 2,342,914 | Williams et al. | Feb. 29, 1944 |
| 2,419,155 | Orton | Apr. 15, 1947 |